United States Patent
Kumar

(10) Patent No.: US 9,454,358 B1
(45) Date of Patent: Sep. 27, 2016

(54) DISTRIBUTED OVER THE AIR PROGRAMMING

(71) Applicant: Omnitracs, LLC, Dallas, TX (US)

(72) Inventor: Vijay Kumar, San Diego, CA (US)

(73) Assignee: OMNITRACS, LLC, Dallas, TX (US)

( * ) Notice: Subject to any disclaimer, the term of this patent is extended or adjusted under 35 U.S.C. 154(b) by 0 days.

(21) Appl. No.: 14/641,131

(22) Filed: Mar. 6, 2015

(51) Int. Cl.
- G06F 9/44 (2006.01)
- G06F 9/445 (2006.01)
- H04W 8/24 (2009.01)

(52) U.S. Cl.
CPC ............. *G06F 8/65* (2013.01); *H04W 8/245* (2013.01)

(58) Field of Classification Search
CPC ......................................... G06F 8/65
USPC ......................................... 717/173
See application file for complete search history.

(56) References Cited

U.S. PATENT DOCUMENTS

| | | | | |
|---|---|---|---|---|
| 2005/0216559 A1* | 9/2005 | Manion | .................. | H04L 67/104 709/205 |
| 2010/0333082 A1* | 12/2010 | Keys | .................. | G06F 8/68 717/173 |
| 2011/0106886 A1* | 5/2011 | Nolterieke | .................. | G06F 8/65 709/204 |
| 2014/0089912 A1* | 3/2014 | Wang | .................. | G06F 8/65 717/173 |
| 2014/0237465 A1* | 8/2014 | Lin | .................. | H04L 67/1063 717/173 |

OTHER PUBLICATIONS

Judy Hartley; "Peer-to-Peer Networking: A Mobile Coming of Age"; Intel Developer Zone website (software.intel.com); Mar. 7, 2012.*
Singh et al.; "Cluster—Based Routing Scheme for Wireless Mesh Networks"; ICACT2011; Feb. 2011.*
International Search Report dated Jul. 18, 2016 issued in counterpart International Patent Application No. PCT/US2016/020917.
Tanenbaum et al., Computer networks. Pearson, 5th ed., 2011. Retrieved from the Internet: <http://ebook-dl.com/item/computer_networks_5th_edition_andrew_s_tanenbaum_david_j_wetherall/>, p. 750, par. 3, p. 751, p. 2 below-p. 752, lines 1-2.

* cited by examiner

*Primary Examiner* — Qing Chen
*Assistant Examiner* — Clint Thatcher
(74) *Attorney, Agent, or Firm* — Arent Fox LLP

(57) ABSTRACT

The present disclosure generally relates to one or more improved systems, methods, and/or devices for leveraging the processing resources of remote units or mobile computing platforms (MCPs) to offload traffic associated with software updates from a back-end server to the one or more MCPs. In some examples, the back-end server may designate a set of remote units or MCPs to act as intermediate download servers for a remaining set of remote units or MCPs in the fleet. Accordingly, the present disclosure improves the overall system performance by distributing the functionalities of the back-end server to a set of remote units or MCPs.

14 Claims, 7 Drawing Sheets

DISTRIBUTED OVER THE AIR PROGRAMMING

BACKGROUND

Systems for tracking, managing and maintaining a fleet of portable assets generally includes one or more systems for monitoring the location of the portable asset and one or more systems for monitoring the performance of the portable asset. A system for monitoring the location of the portable asset may include a radio transmitter, a global positioning system (GPS) device, a terrestrial-based communication system such as a cellular network, or another type of communication device capable of periodically or continuously reporting its geographic location and other metrics relating to the portable asset to a receiving device. A system for monitoring the performance of the portable asset may include a number of sensors that collect and report vehicle performance data and a user interface for monitoring operator interaction with the portable asset. For example, in an aspect, the system for tracking, managing and maintaining the portable assets may include, but is not limited to, a remote unit referred to as a mobile computing platform product (MCP) located in a cab and/or trailer of a vehicle transporting a portable asset, which communicates with a network management center (NMC) that collects and analyzes information from one or more MCPs in a fleet. An example of an MCP includes, but is not limited to, an MCP 50, an MCP 100, an MCP 110, an MCP 200, and a TT210 sold by Omnitracs, LLC of Dallas, Tex.

Occasionally, the remote units or MCPs of the system for tracking, managing and maintaining the portable assets may require software updates from a back-end server in order to maintain an up-to-date system configuration. In some scenarios, the number of back-end servers may be limited, however, and the number of remote units or MCPs requiring software updates may be extensive (e.g., 200,000 MCPs). Therefore, updating each of the remote units or MCPs in the fleet using a limited set of back-end servers may result in high traffic load and/or significant delays.

Therefore, improvements in effectively managing the software updates of remote units or MCPs without causing system degradation are desired.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

The described features of the present disclosure generally relate to one or more improved systems, methods, and/or devices for leveraging the processing resources of remote units or MCPs to offload traffic relating to software updates from a back-end server. In some examples, the back-end server may designate a set of one or more remote units or MCPs to act as intermediate download servers for a remaining set of remote units or MCPs in the fleet. Therefore, in some examples, a server may first configure a set of designated remote units or MCPs to download the software update directly from the server. Subsequently, the server may broadcast the availability of the designated remote units or MCPs to the remaining set of remote units or MCPs in the fleet, and allow the remaining set of remote units or MCPs to download the software update from one or more of the designated remote units or MCPs without accessing the server. Accordingly, the present disclosure improves the overall system performance by distributing the functionalities of the back-end server to a set of remote units or MCPs.

According to a first set of illustrative embodiments, a method for wireless communications is described. The method may include downloading, from a server, a software update to a first mobile computing platform (MCP) and receiving, in response to the downloading, a download complete message from the first MCP. In some examples, the method may further include identifying a second MCP in proximity to the first MCP and transmitting a broadcast message to the second MCP, wherein the broadcast message includes over-the-air (OTA) file download information regarding contacting the first MCP for downloading the software update. In some aspects, an apparatus and/or a computer readable medium may perform the steps identified in the method of the first set of illustrative embodiments.

According to a second set of illustrative embodiments, another method for wireless communications is described. The method may include downloading, at a first mobile computing platform (MCP), a software update from a server and determining whether the software update has been successfully downloaded. In some examples, the method may further include receiving, from a second MCP, a download request identifying the software update and requesting a download, and downloading, from the first MCP to a second MCP, the software update software update in response to the download request from the second MCP. In some aspects, an apparatus and/or a computer readable medium may perform the steps identified in the method of the first set of illustrative embodiments.

According to a third set of illustrative embodiments, yet another method for wireless communications is described. The method may include receiving, at a second MCP, a broadcast message from a server. In some aspects, the broadcast message may include over-the-air (OTA) file download information regarding contacting the first MCP for downloading a software update. In some aspects, the method may include establishing communication with a first MCP based on the broadcast message, and downloading the software update at the second MCP from the first MCP. In some aspects, an apparatus and/or a computer readable medium may perform the steps identified in the method of the first set of illustrative embodiments.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details.

As discussed above, updating software of a plurality of remote units or MCPs in a fleet using a limited set of back-end servers may result in high traffic load and/or significant delays. Accordingly, the present disclosure leverages the resources (e.g., processing and storage capabilities) of the remote units or MCPs to offload traffic from the servers. As such, the remote units or MCPs may act as intermediate servers, or peer-to-peer servers, for implementing over-the-air (OTA) software updates. In an aspect, the software update may include a set of one or more software files having updated configuration parameters and/or programming code for a software product previously stored on the remote unit or MCP. In another aspect, the software update may include a set of one or more software files defining a new software product to be stored on the remote unit or MCP. In some examples, one or more designated remote units or MCPs may download the software update from a back-end server and distribute the software update to other remote units or MCPs in the fleet. Accordingly, the present aspects allow for distributed OTA downloading of the software update efficiently across the entire fleet of remote units or MCPs that is faster, less expensive, and more scalable relative to relying on downloads distributed by a limited number of servers.

Figure 1:
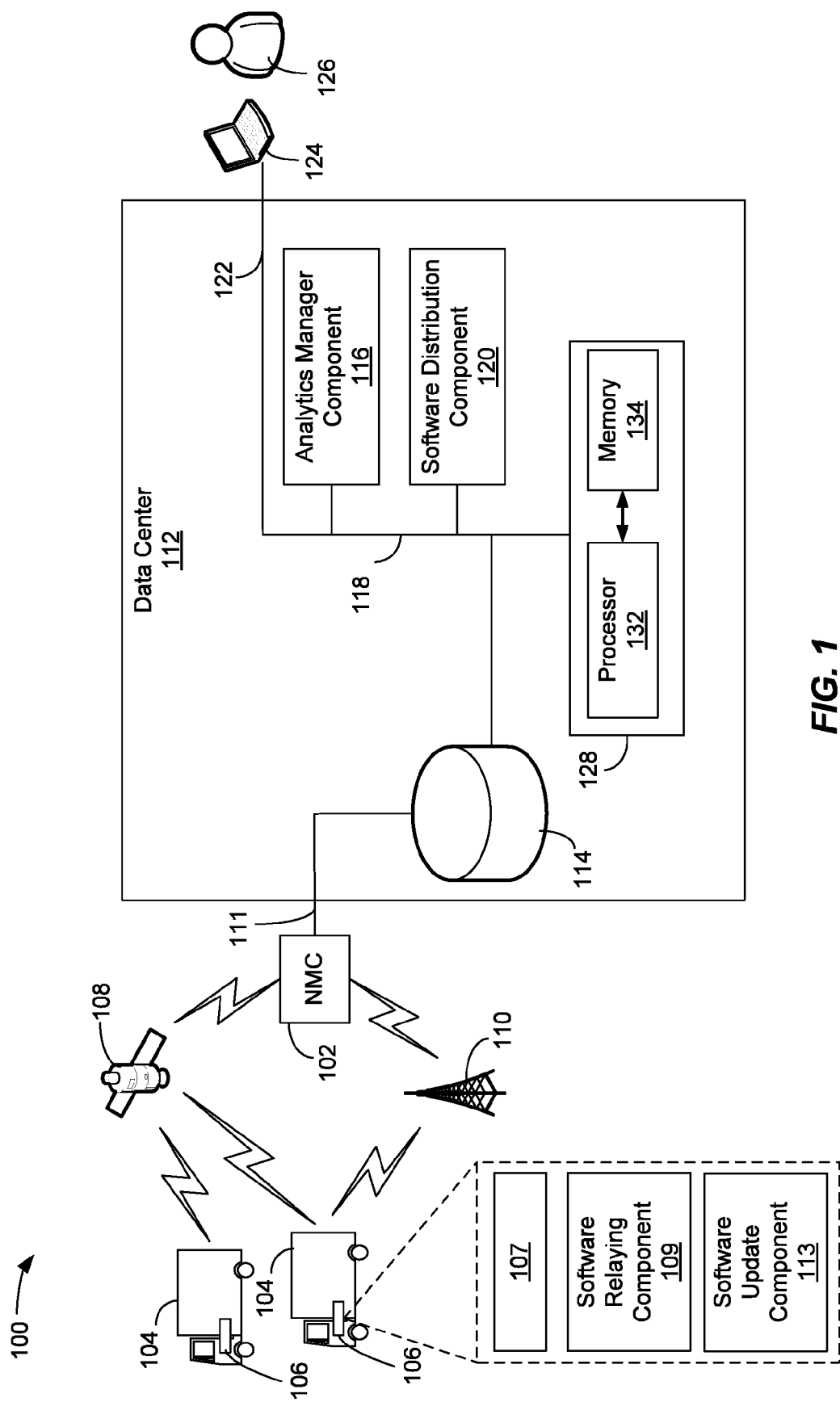
FIG. 1 is a functional block diagram of example elements of an aspect of a system for distributing server functionalities to a host of mobile devices.

Referring to FIG. 1, in an aspect, a system 100 includes components for collecting, analyzing and presenting fleet and/or driver management or performance data. In an aspect, system 100 can comprise a network management center 102 configured to communicate with one or more vehicles 104. The system 100 includes fleets of vehicles 104, each fleet having at least one vehicle. However, typically, a fleet could include many tens, hundreds or thousands of vehicles. An example fleet is illustrated as having vehicles 104. Additional fleets (not shown) are contemplated, but not shown. In implementations, each of the vehicles 104 can comprise a mobile computing platform (MCP) 106 configured to collect and transmit data associated with the operation of the vehicle 104 to the NMC 102. Also, in some implementations, MCP 106 can be configured to perform calculations associated with one or more fleet and/or driver management or performance applications 107 using any of the collected data.

Periodically, an operator of system 100 may determine to send a software update to one or more MCP 106 in order to maintain a current system configuration or functionality. However, if each MCP 106 in the fleet attempts to perform the software update using the limited set of back-end servers, such as one or more servers associated with NMC 102 and/or data center 112, the system 100 may experience high traffic loads, and thus may suffer from overall system performance Therefore, in order to mitigate the system degradation, each MCP 106 may include a software relaying component 109 and/or software update component 113. Each software update component 113 may include an application executable by a processor, or processor hardware or firmware modules, for downloading the software update from server associated with the NMC 102 and/or data center 112, or from one or more designated other MCP(s) 106. Further, each software relaying component 109 may include an application executable by a processor, or processor hardware or firmware modules, for relaying the downloaded software files to other vehicles 104 in the fleet. Additionally or alternatively, the software update component 113 may be configured to install the software files downloaded from the NMC 102 or from other MCP(s) 106. In an aspect, for example, one or more designated MCP(s) 106 may download the software update from a back-end server, e.g., associated with NMC 102 and/or data center 112, and distribute the software update to one or more other MCP(s) 106, such as other MCPs in a same fleet.

Yet further, in some implementations, MCP 106 may include a processor configured to execute communications and one or more fleet and/or driver management or performance applications, and a memory configured to store the applications and any data associated with MCP 106. MCP 106 may also include a user interface or display, a mobile application server, and a communications component (e.g., including one or more of terrestrial and Wi-Fi modems, one or more antennae, a GPS component, and a satellite communications component). For example, in an aspect, MCP 106 may include, but is not limited to, an MCP200 platform sold by OMNITRACS LLC of Dallas, Tex., which may include applications including but not limited to Analytics Manager, Critical Event Reporting, Driver Workflow, Extended Productivity Suite, Fault Monitoring, Hours of Service, In-Cab Navigation, In-Cab Scanning, In-Cab Video Training, Media Manager, Performance Monitoring with Fuel Manager, Predictive Performance Service, Trip Manager, Vehicle Maintenance and Inspection Reporting, and Web Browsing.

As an example only, each vehicle 104 is in bi-directional communication with a network management center (NMC) 102 over at least one communication channel. In the example shown in FIG. 1, each vehicle 104 is in bi-directional communication with the NMC 102 over at least one of a satellite-based communication system 108 and a terrestrial-based system 110 (e.g., GSM, CDMA, TDMA, WCDMA, EDGE, OFDM, GPRS, EV-DO, WiFi, and others). Depending on many factors, data may be exchanged with the vehicles 104 using any combination of the satellite communication system 108 and the terrestrial-based communication system 110.

In an aspect, many different types of data are collected and transferred from the vehicles 104 to the NMC 102, Examples of such data include, but are not limited to, driver performance data, driver duty status, truck performance data, critical events, messaging and position data, location delivery data, and many other types of data. All of the information that is communicated to and from the vehicles 104 is processed via the NMC 102. The NMC 102 can be thought of as a data clearinghouse that receives all data that is transmitted to and received from the vehicles 104. Moreover, in an aspect, NMC 102 may include one or more back-end servers for distributing the software update to one or more MCP(s) 106

The system 100 also includes a data center 112, which may be part of or in communication with NMC 102. The data center 112 illustrates one possible implementation of a central repository for all of the data received from each of the vehicles 104. As an example, as mentioned above many different types of data are transmitted from the vehicles 104 to the NMC 102. In the case where data center 112 is in communication with NMC 102, the data may be transmitted via connection 111 to the data center 112. The connection 111 may comprise any wired or wireless dedicated connection, a broadband connection, or any other communication channel configured to transport the data. Moreover, in an aspect, data center 112 may include one or more back-end servers for distributing the software update to one or more MCP(s) 106.

In an aspect, the data center 112 may include a data warehouse 114 for receiving the data from vehicles 104 relating to fleet and/or driver management or performance. In an aspect, for example, data center 112 may include any number of application servers and data stores, where each may be associated with a separate fleet and/or driver management or performance data. In an aspect, each application server and data store may include a processor, memory including volatile and non-volatile memory, operational software, a communication bus, an input/output mechanism, and other operational systems. For example only, a first application server may be a services portal (SP) server that receives, for example, messaging and positioning (M/P) data and/or location delivery efficiency (LDE) data from each of the vehicles 104. Another application server, for example only, may include one or more servers related to safety and compliance, such as a quick deployment center (QDC) server that receives, for example, critical event (CE) data from each of the vehicles 104, or such as an hours of service (HOS) server that receives data related to, for example, duty status (DS) data such as the number of hours that a driver operates a vehicle 104. Further, for example, another application server may be a fuel cost server that receives, for example, vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 112 may include additional and/or different application servers.

In an aspect, the data center 112 may include an analytics manager component 116 for analyzing the data in data warehouse 114 from vehicles 104 and generating fleet and/or driver management or performance metrics. For example, analytics manager component 116 may generate fleet and/or driver management or performance metrics associated with one or more applications on MCP 106.

Additionally or alternatively, the data center 112 may include a software distribution component 120 that may be in communication with one or more servers discussed above. It should be noted that software distribution component 120 may be located elsewhere in system 100, such as at NMC 102 and/or one or more servers associated with NMC 102 or data center 112. In any case, the software distribution component 120 may be configured to manage software and applications installed on the one or more MCP(s) 106. In some examples, the software distribution component 120 may be configured to forward the software update to one or more MCP(s) 106. For example, in an aspect, the software distribution component 120 may coordinate with a set of designated MCP(s) 106 to relay or distribute one or more software updates, each including one or more software files, to other non-designated MCP(s) 106 in the network. In this case, for example, the set of designated MCP(s) 106 defines a distributed set of MCPs that assist in downloading the software update to the remaining MCPs.

In some aspect, analytics manager component 116 may implement a set of routines that define query data warehouse 114 over connection 118 and that receives data from data warehouse 114 over connection 118. The analytics manager component 116 may capture, manipulate, and provide this data in a usable format, for example, over connection 122 for display on a terminal device 124. The terminal device 124 can be a user interface portal, a web-based interface, a personal computer (PC), a laptop, a personal data assistant (PDA), a dedicated terminal, a dumb terminal, or any other device over which a user 126, such as a manager or operator responsible for monitoring a fleet of vehicles 104, can view the display provided by the terminal device 124. In an aspect, analytics manager component 116 is an analysis engine defined by or operating via an execution system 128, for example, connected via a system bus 130. In an aspect, the execution system 128 includes a processor 132 and a memory 134. The memory 134 can store the routines that are associated with analytics manager component 116 and software distribution component 120. In an aspect, the processor 132 can execute the stored routines to implement the functionality of analytics manager component 116 and software distribution component 120 that are described herein. In another aspect, the functionality of analytics manager component 116 and software distribution component 120 as described herein may be implemented in one or more hardware or firmware processor modules of processor 132. Although shown as residing within the data center 112, the execution system 128 may reside elsewhere, and may be implemented as a distributed system in which the processor 132 and the memory 134 are located in different places, such as at NMC 102 and/or one or more servers associated with NMC 102 or data center 112.

Figure 2:
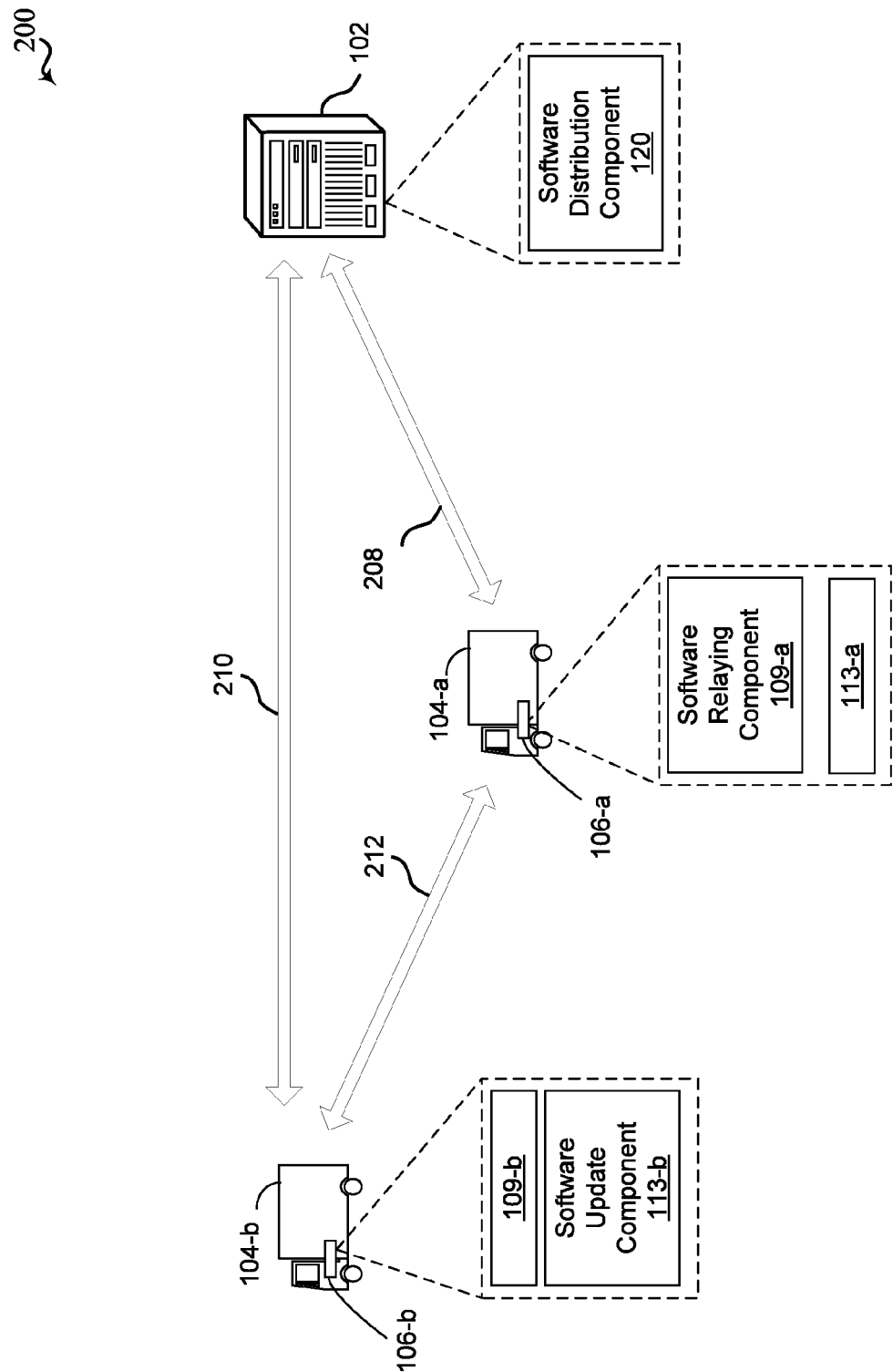
FIG. 2 is a functional block diagram of example elements of an aspect of the system for managing software updates in accordance with the present disclosure.

Referring to FIG. 2, a subset 200 of elements of system 100 may include NMC 102 and one or more vehicles 104 as discussed with reference to FIG. 1. The NMC 102 may include a software distribution component 120. Additionally or alternatively, one or more vehicles 104 may further include MCP(s) 106 comprising software relaying component 109 and/or software update component 113.

In accordance with the present disclosure, the software distribution component 120 of the NMC 102 may designate a set of MCP(s) 106 as designated MCPs (e.g., MCP 106-*a* associated with the vehicle 104-*a*) for software update distribution purposes. In some aspects, for example, the designated MCP(s) may be configured to act as intermediate server(s) or peer-to-peer servers for downloading a software update to the remaining MCP(s) 106, such as one or more remainders in a fleet of MCPs. In some examples, the software distribution component 120 may dynamically adjust the number of designated MCP(s). Accordingly, the software distribution component 120 may generate and transmit an assignment message to the one or more MCP(s) 106-*a* informing the respective MCP that it is a designated MCP with respect to distributed downloading of a software update. Based on receiving the assignment message, the designated MCP(s) 106-*a* may begin downloading a software update, including one or more software files, from NMC 102 and/or an associated server via communication link 208. In some aspects, the designated MCP 106-*a* may actively monitor the status of the download. Thus, in some examples, the software relaying component 109-*a* of the designated MCP 106-*a* may determine whether the software update has been successfully downloaded based on the active monitoring.

Upon a successful completion of the downloading of the software update, the software relaying component 109-*a* may transmit a download complete message to the NMC 102 via communication link 208. Alternatively, if the software relaying component 109-*a* determines that the software update has not been successfully downloaded, the software relaying component 109-*a* may transmit an error message to the NMC 102 to request retransmission of the software update.

In some aspects, the software distribution component 120, upon receiving a download complete message from the software relaying component 109-*a* of the designated MCP 106-*a*, may identify one or more non-designated MCP(s) (e.g., second MCP 106-*b*) in proximity to the designated MCP(s) (e.g., first MCP 106-*a*). Identifying the one or more second MCP(s) 106-*b* in proximity to the first MCP 106-*a* may include determining a first IP address of the first MCP 106-*a*, the second IP address of the second MCP 106-*b* and determining whether the first MCP 106-*a* and the second MCP 106-*b* are connected to the same Wi-Fi network ID based on the first and second MCP IP addresses respectively. In some aspects, identifying the one or more second MCP(s) in proximity to the first MCP 106-*a* may include determining whether the first MCP 106-*a* and the second MCP 106-*b* are on the same subnet based on the first and second MCP IP addresses. Further, the software distribution component 120, following an identification of one or more second MCP(s) 106-*b* within proximity of the first MCP 106-*a*, may broadcast a message to the one or more second MCP(s) 106-*b* via communication link 210. The broadcast message may include over-the-air (OTA) file download information for identifying the availability of the first MCP(s) 106-*a*, a procedure for establishing communication with the first MCP(s) 106-*a*, and/or a request to the second MCP(s) 106-*b* to download the software update directly from the first MCP(s) 106-*a*.

Based on the broadcast message, the software update component 113-*b* of the second MCP 106-*b* may establish communication with the first MCP 106-*a* via link 212. In some examples, the communication link 212 between the first MCP 106-*a* and the second MCP 106-*b* may be established via a Wi-Fi network, or a cellular network, or a satellite network. Upon establishing communication link 212 between the first MCP 106-*a* and the second MCP 106-*b*, the software update component 113-*b* may initiate downloading of the software update from the first MCP 106-*b*, e.g., instead of performing the download from NMC 102 or data center 112 or a server associated with NMC 102 or data center 112.

Figure 3:
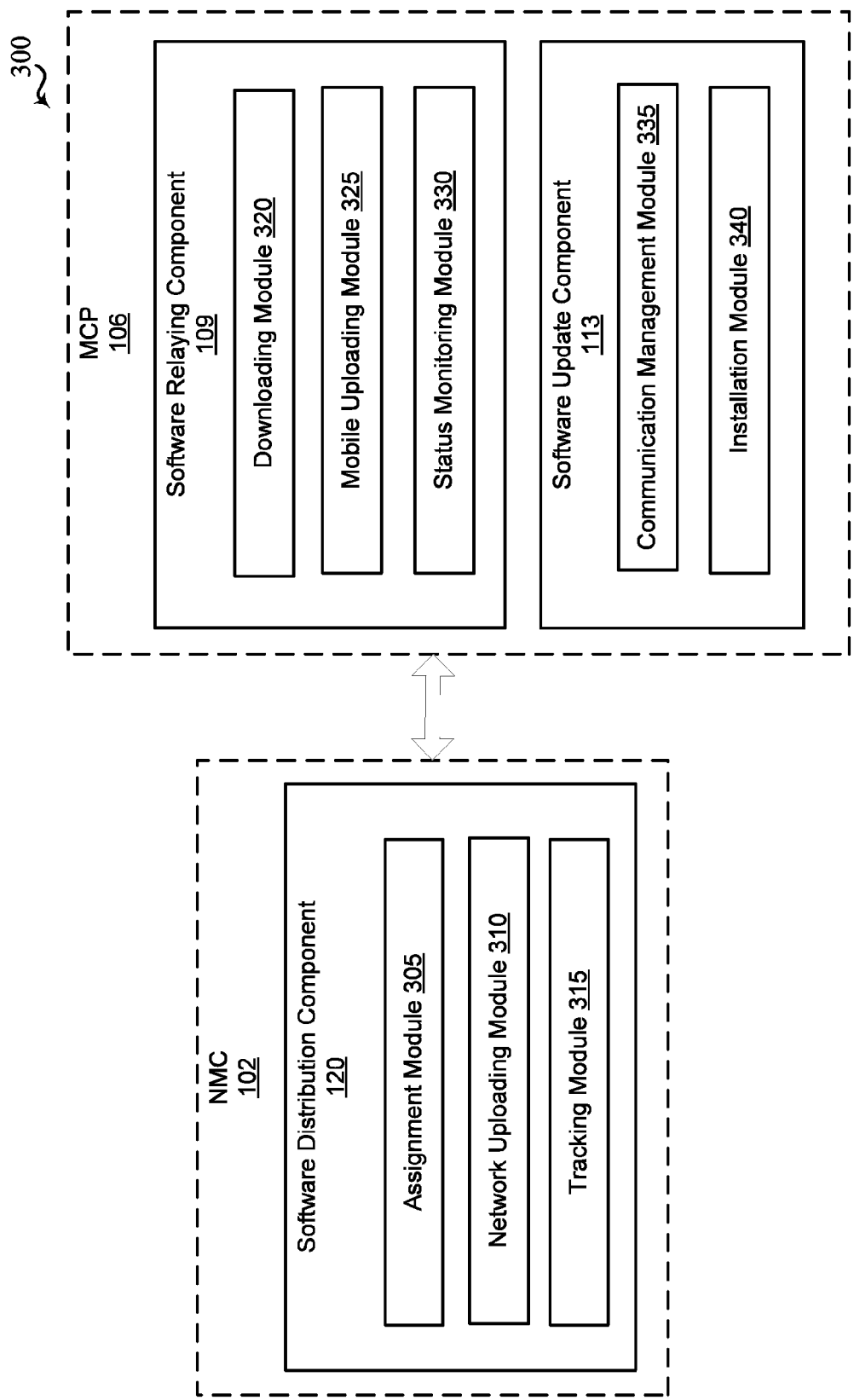
FIG. 3 is a schematic diagram of and aspect of the subcomponents of the system for managing software updates in accordance with the present disclosure.

Referring to FIG. 3, a subset 300 of system 100 highlights additional subcomponents of an aspect of NMC 102 and MCP 106 as discussed with reference to FIGS. 1-2 above.

In accordance with the present disclosure, the NMC 102 may include a software distribution component 120 as described with reference to FIGS. 1-2. Additionally or alternatively, the software distribution component 120 may include an assignment module 305 for assigning one or more MCP(s) 106 as designated mobile devices. In some aspects, the designated mobile devices may act as intermediate or peer-to-peer servers to offload the downloading tasks associated with MCP software updates from the one or more servers of NMC 102 and/or data center 112. The assignment module 305 may generate an assignment message to transmit to one or more MCP(s) 106 in order to inform the MCP(s) of its designation for assisting in downloading of a software update. The software distribution component 120 may also include a network uploading module 310 to download a software update, including new software products and/or updated versions of existing software or configuration files associated with a previously downloaded software product, to the one or more MCP(s) 106. Additionally or alternatively, the software distribution component 120 may include a tracking module 315 for determining whether the one or more non-designated MCP(s) 106 is in proximity of the designated MCP(s) 106 in order to determine which of the one or more non-designated MCP(s) 106 should be instructed to contact which of the designated MCP(s) 106 for downloading of the software update. In some aspects, the tracking module 315 may utilize the real-time data received from the vehicles 104 or from the respective MCP 106 located in the vehicle 104 to identify the IP addresses of the one or more MCP(s) 106.

Additionally, MCP 106 may include software relaying component 109 and software update component 113 as described with reference to FIGS. 1-2. The software relaying component 109 may include a downloading module 320 to download a software update from the NMC 102. The downloading module 320 may additionally be utilized to download a software update from other MCP(s) 106 in accordance with the aspects of the present disclosure. In further examples, the software relaying component 109 may include a mobile uploading module 325 to download software update to other MCP(s) 106. In yet further example, the software relaying component 109 may include a status monitoring module 330 for monitoring the status of the software update download. Based on the monitoring, the status monitoring module 330 may generate a download complete message to transmit to NMC 102.

In some aspects, the MCP 106 may include a software update component 113 as described with reference to FIGS. 1-2. The software update component 113 may include a communication management module 335 to establish communication with the NMC 102 and/or other MCP(s) 106, such as an MCP designed to assist in downloading of a software update. In other aspects, the software update component 113 may also include an installation module 340 for installing the downloaded software files in the memory of the MCP 106.

Figure 4A:
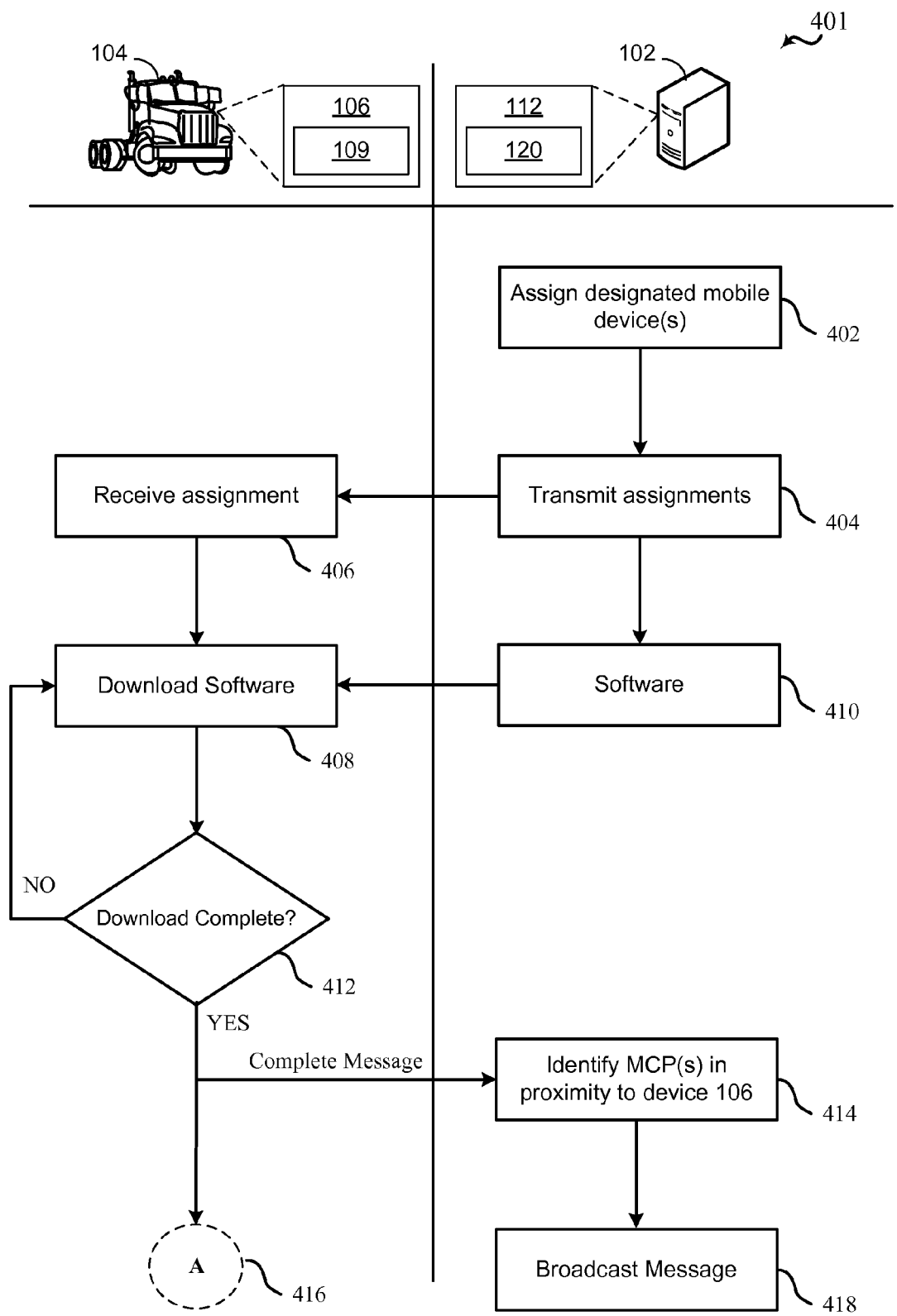
FIG. 4A is a flowchart of an example of an aspect of a method managing software updates in accordance with the present disclosure.

Referring to FIG. 4A, an example of a method 401 for managing software updates in accordance with the present disclosure includes an interaction between the NMC 102 and a designated MCP 106 for relaying a downloaded software update to other MCP(s), such as other MCPs in a same fleet.

As mentioned above, the NMC 102 may include or be associated with a data center 112. The data center 112, in some examples, may further include software distribution component 120. The method 401 also illustrates one or more vehicles 104 comprising MCP(s) 106. In some aspects, the MCP(s) 106 may include software relaying component 109 and software update component 113 (not shown).

In accordance with the present disclosure, the software distribution component 120, at block 402, may initiate the method 401 by assigning one or more MCP(s) 106 as designated mobile device(s) configured to act as intermediate servers for downloading a software update to other MCPs. Aspects of block 402 may be performed by the assignment module 305 as described with reference to FIG. 3. In some examples, the assignment module 305, at block 404, may further generate an assignment message to be transmitted by a transceiver (not shown) to one or more MCP(s) 106. At block 406, the assignment message may be received by the one or more MCP(s) 106. Aspects of block 406 may be performed by a receiver (not shown).

Based on the assignment, the software relaying component 109, at block 408, may trigger downloading of at least one software update from the software distribution component 120. Aspects of block 408 may be performed by a downloading module 320 described with reference to FIG. 3. In response to the downloading trigger, the software distribution component 120, at block 410, may begin downloading the at least one software update to the MCP 106. Aspects of block 410 may be performed by network uploading module 310 described with reference to FIG. 3.

As discussed above, the software relaying component 109 may actively monitor the status of the download. Therefore, at block 412, the software relaying component 109 may determine whether the download has been successfully completed. If the download of the software update has not been successfully completed, the method 401, in one example, may return to block 408 to continue downloading the software update. Alternatively, in another example, the software relaying component 109 may issue an error message to the software distribution component 120 to request retransmission of the software update. Aspects of block 412 may be performed by status monitoring module 330. If, however, at block 412, the status monitoring module 330 determines that the download has completed successfully, the software distribution component 120 may issue a download complete message to the software distribution component 120 and proceed to step 416 described in FIG. 4B.

In some aspects, at block 414, the software distribution component 120, upon receiving the download complete message, may identify one or more non-designated MCP(s) in close proximity to the designated MCP 106. Aspects of block 414 may be performed by the tracking module 315. In some examples, the tracking module 315 may identify the one or more non-designated MCP(s) in proximity to the designated MCP 106 by determining the IP address of the first MCP(s) and the second MCP(s).

Subsequently, the software distribution component 120 may proceed to block 418 for broadcasting a message to the non-designated MCP(s). The broadcast message may include OTA file download information regarding the availability of the designated MCP(s) 106, a procedure to establish communication with the designated MCP(s) 106 and/or a request to the non-designated MCP(s) to download at least one software update from the designated MCP(s) 106. Aspects of block 418 may be performed by a transceiver (not shown) configured to transmit data and messages on the network.

Figure 4B:
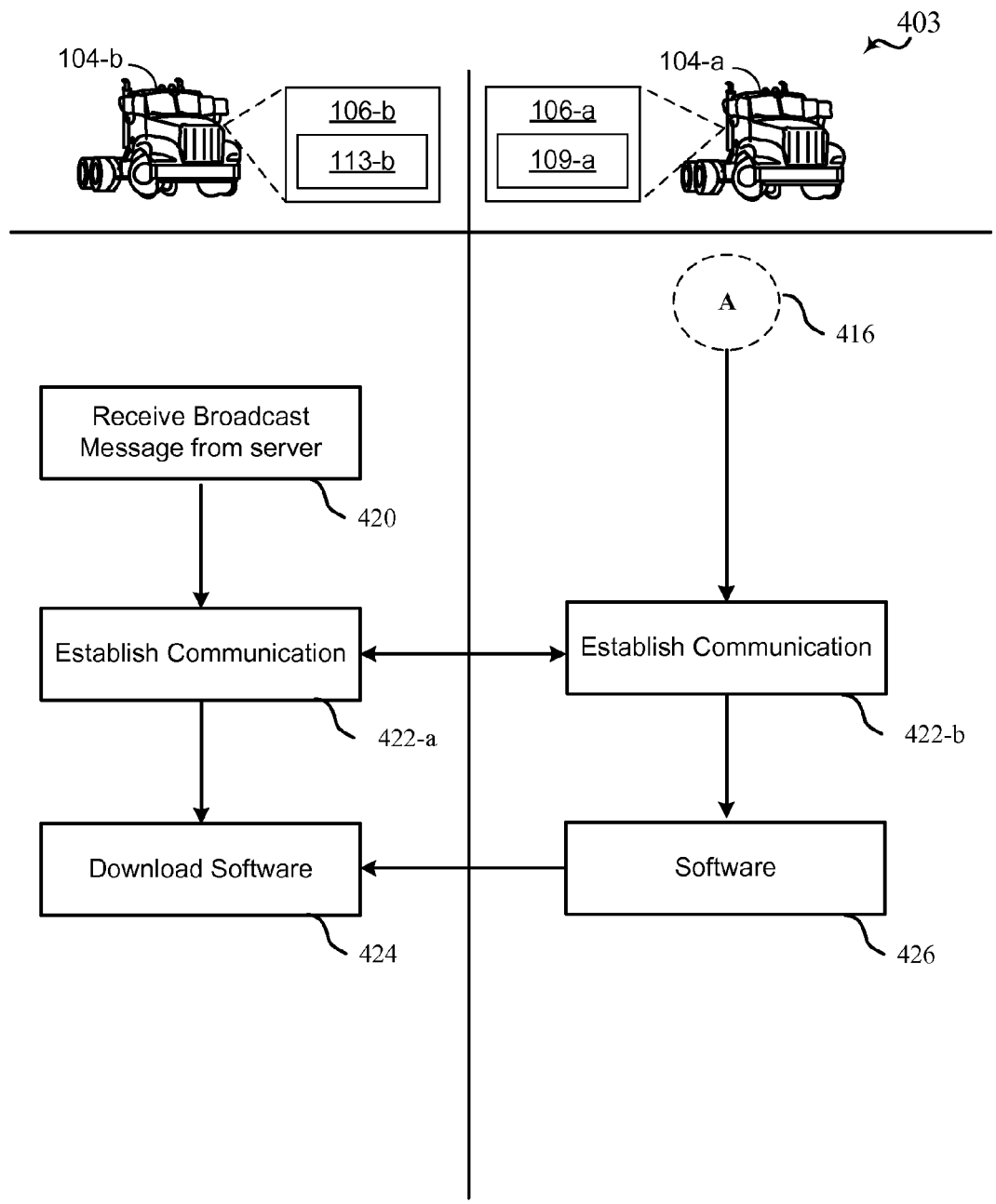
FIG. 4B is a flowchart of an example of an aspect of a method managing software updates in accordance with the present disclosure.

Referring to FIG. 4B, an example of a method 403 for managing software updates in accordance with the present disclosure includes an interaction between a designated MCP 106-a and a non-designated MCP 106-b for relaying the software updates to MCP(s) in the fleet without overloading the server. In some examples, the designation MCP(s) 106-a may include software relaying component 109-a. Additionally or alternatively, a non-designation MCP(s) 106-b may include a software update component 113-b. It should be understood that each of the software relaying component 109 and the software update component 113 may be part of both MCP(s) (i.e., MCP 106-a and MCP 106-b).

In one aspect, at block 420, a non-designated MCP 106-b associated with the vehicle 104-b may receive a broadcast message from the NMC (or server). Aspects of block 420 may be performed by a receiver (not shown). Upon receiving the broadcast message from the server, the software update component 113-b, at block 422, may establish a communication link with a designated MCP 106-a. Aspects of block 422 may be performed by communication management module 335 as described with reference to FIG. 3. In some examples, communication between the first MCP (e.g., designated MCP 106-a) and the second MCP (e.g., non-designated MCP 106-b) may be established via a Wi-Fi network, or a cellular network, or a satellite network.

Following an establishment of a communication link, the software update component 113-b, at block 424 may initiate downloading of at least one software update from the software relaying component 109-a. In response to the download initiation by the software update component 113-b, the software relaying component 109-a, at block 426, may begin downloading the requested software update. Aspects of blocks 424 and 426 may be performed by the downloading module 320 and mobile uploading module 325 respectively.

Figure 5:
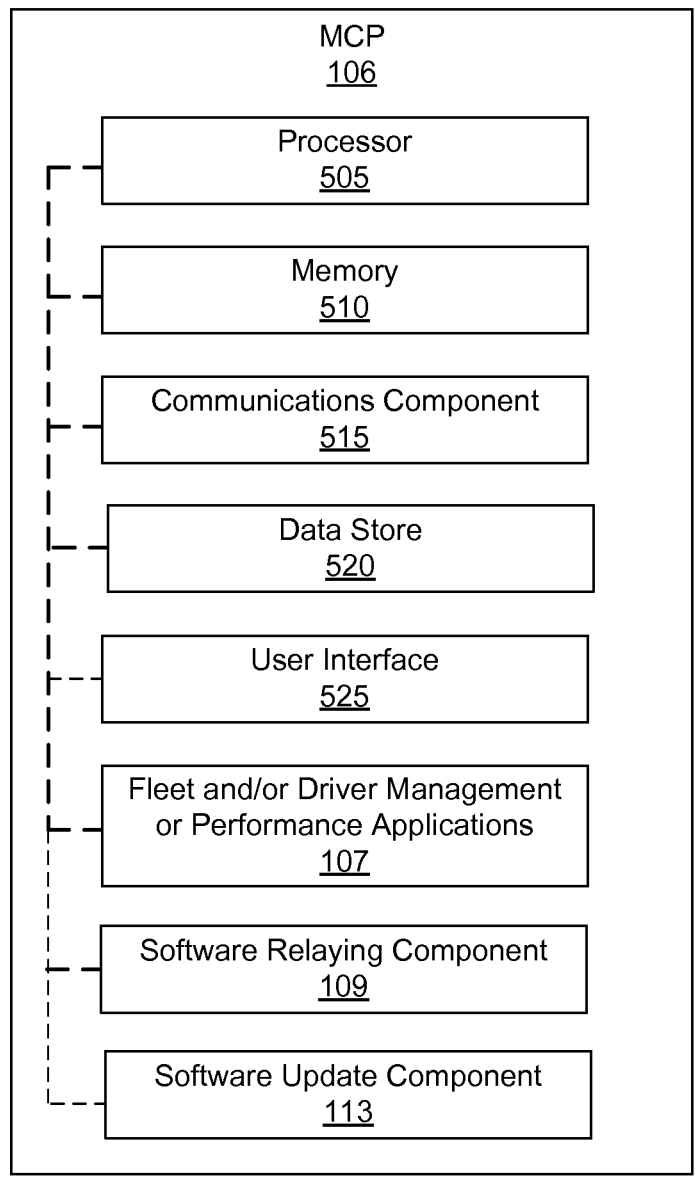
FIG. 5 is a block diagram of an example of an aspect of a mobile computing platform with a software relaying component and software update component in accordance with the present disclosure.

FIG. 5 illustrates an example of MCP 106 for managing software updates in accordance with the present disclosure. In one aspect, the MCP 106 may include a processor 505 that may be or may include a specially programmed or configured computer device to perform the functions described herein. In one aspect of implementation, MCP 106 may include software relaying component 109, software update component 113 and its sub-components, including downloading module 320, mobile uploading module 325, status monitoring module 330, communication management module 335 and/or installation module 340, such as in specially programmed computer readable instructions or code, firmware, hardware, or some combination thereof.

In an aspect, for example as represented by the dashed lines, features described herein may be implemented in or executed using one or any combination of processor 505, memory 510, communications component 515, and data store 520. For example, software relaying component 109 and/or software update component 113 may be defined or otherwise programmed as one or more processor modules of processor 505. Further, for example, software relaying component 109 and/or software update component 113 may be defined as a computer-readable medium (e.g., a non-transitory computer-readable medium) stored in memory 510 and/or data store 520 and executed by processor 505. Moreover, for example, inputs and outputs relating to operations of software relaying component 109 and/or software update component 113 may be provided or supported by communications component 515, which may provide a bus between the components of computer device or an interface for communication with external devices or components.

In some aspects, MCP 106 may include processor 505 specially configured to carry out processing functions associated with one or more of components and functions described herein. Processor 505 can include a single or multiple set of processors or multi-core processors. Moreover, processor 505 can be implemented as an integrated processing system and/or a distributed processing system.

The MCP 106 further includes memory 510, such as for storing data used herein and/or local versions of applications and/or software and/or instructions or code being executed by processor 505, such as to perform the respective functions of the respective entities described herein. Memory 510 can include any type of memory usable by a computer, such as random access memory (RAM), read only memory (ROM), tapes, magnetic discs, optical discs, volatile memory, non-volatile memory, and any combination thereof.

Further, MCP 106 may include communications component 515 that provides for establishing and maintaining communications with one or more parties utilizing hardware, software, and services as described herein. Communications component 515 may carry communications between components on MCP 106, as well as between user and external devices, such as devices located across a communications network and/or devices serially or locally connected to MCP 106. For example, communications component 515 may include one or more buses, and may further include transmit chain components and receive chain components associated with a transmitter and receiver, respectively, or a transceiver, operable for interfacing with external devices.

Additionally, MCP 106 may further include data store 520, which can be any suitable combination of hardware and/or software, that provides for mass storage of information, databases, and programs employed in connection with aspects described herein. For example, data store 520 may be a data repository for applications not currently being executed by processor 505.

MCP 106 may additionally include a user interface component 525 operable to receive inputs from a user, and further operable to generate outputs for presentation to the user. User interface component 525 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 525 may include one or more output devices, including but not limited to a display, a speaker, a haptic feedback mechanism, a printer, any other mechanism capable of presenting an output to a user, or any combination thereof.

Figure 6:
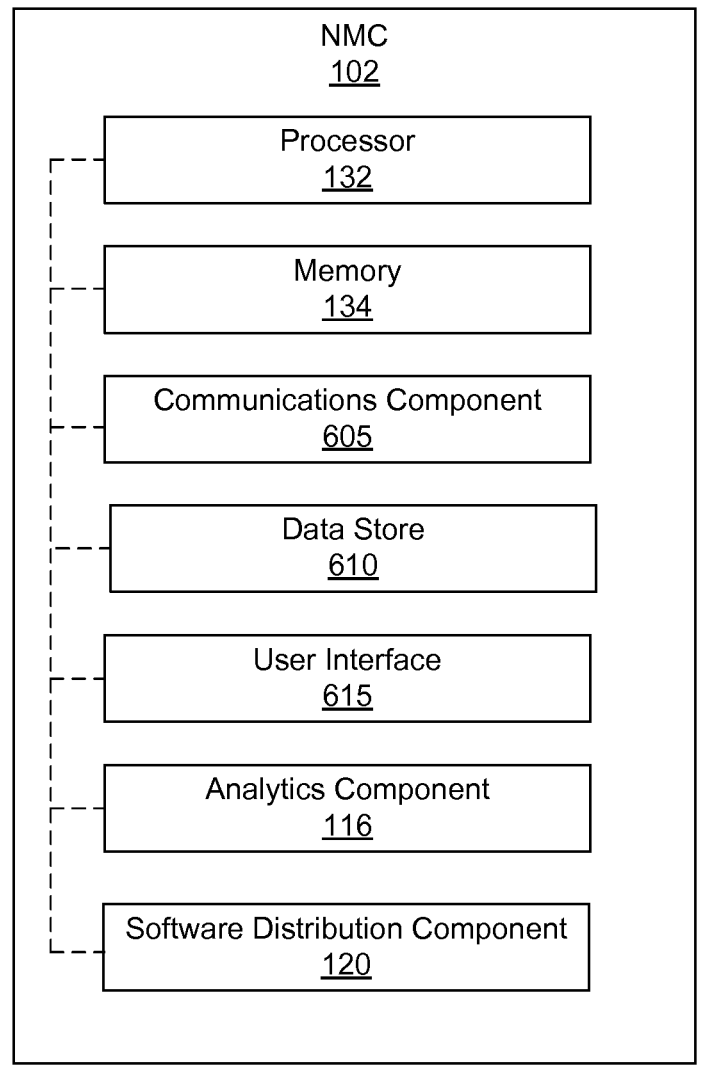
FIG. 6 is a block diagram of an example of an aspect of a network management center (NMC) with a software distribution component in accordance with the present disclosure.

FIG. 6 illustrates an example of NMC 102 for managing software updates in accordance with the present disclosure. In one aspect, the NMC 102 may include a processor 132 that may be or may include a specially programmed or configured computer device to perform the functions described herein. In one aspect of implementation, NMC 102 may include software distribution component 120 and its sub-components, including assignment module 305, network uploading module 310 and/or tracking module 315, such as in specially programmed computer readable instructions or code, firmware, hardware, or some combination thereof.

In an aspect, for example as represented by the dashed lines, features described herein may be implemented in or executed using one or any combination of processor 132, memory 134, communications component 605, and data store 610. For example, analytics component 116 and/or software distribution component 120 may be defined or otherwise programmed as one or more processor modules of processor 132. Further, for example, software distribution component 120 may be defined as a computer-readable medium (e.g., a non-transitory computer-readable medium) stored in memory 134 and/or data store 610 and executed by processor 132. Moreover, for example, inputs and outputs relating to operations of analytics component 116 and/or software distribution component 120 may be provided or supported by communications component 605, which may provide a bus between the components of computer device or an interface for communication with external devices or components.

In some aspects, NMC 102 may include processor 132 specially configured to carry out processing functions associated with one or more of components and functions described herein. Processor 132 can include a single or multiple set of processors or multi-core processors. Moreover, processor 132 can be implemented as an integrated processing system and/or a distributed processing system.

The NMC 102 further includes memory 134, such as for storing data used herein and/or local versions of applications and/or software and/or instructions or code being executed by processor 132, such as to perform the respective functions of the respective entities described herein. Memory 134 can include any type of memory usable by a computer, such as random access memory (RAM), read only memory (ROM), tapes, magnetic discs, optical discs, volatile memory, non-volatile memory, and any combination thereof.

Further, NMC 102 may include communications component 605 that provides for establishing and maintaining communications with one or more parties utilizing hardware, software, and services as described herein. Communications component 605 may carry communications between components on NMC 102, as well as between user and external devices, such as devices located across a communications network and/or devices serially or locally connected to NMC 102. For example, communications component 605 may include one or more buses, and may further include transmit chain components and receive chain components associated with a transmitter and receiver, respectively, or a transceiver, operable for interfacing with external devices.

Additionally, NMC 102 may further include data store 610, which can be any suitable combination of hardware and/or software, that provides for mass storage of information, databases, and programs employed in connection with aspects described herein. For example, data store 610 may be a data repository for applications not currently being executed by processor 132.

NMC 102 may additionally include a user interface component 615 operable to receive inputs from a user, and further operable to generate outputs for presentation to the user. User interface component 615 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for wireless communication, comprising:
   downloading, from a server, a software update to a first mobile computing platform (MCP);
   receiving, in response to the downloading, a download complete message from the first MCP;
   identifying a second MCP in proximity to the first MCP; and
   transmitting a broadcast message from the server to the second MCP, wherein the broadcast message includes over-the-air (OTA) file download information regarding contacting the first MCP for downloading the software update;
   wherein the OTA file download information comprises contact information that allows the second MCP to establish communication with the first MCP and identify the software update for download, and
   wherein the contact information contains a first IP address of the first MCP to facilitate communication.

2. The method of claim 1, further comprising:
   assigning the first MCP as a designated mobile device for downloading the software update to other MCPs; and
   transmitting an assignment message to the second MCP, wherein the assignment message comprises a list of designated mobile devices.

3. The method of claim 1, wherein identifying the second MCP in proximity to the first MCP comprises:
   determining the first IP address of the first MCP; and
   determining a second IP address of the second MCP.

4. The method of claim 1, further comprising:
   establishing communication between the first MCP and the server using a Wi-Fi network, or a cellular network, or a satellite network.

5. The method of claim 1, wherein the broadcast message including the OTA file download information comprises a download request that requests the second MCP to download the software update from the first MCP.

6. The method of claim 1, wherein downloading the software update comprises downloading at least one configuration parameter associated with the software update or an updated version of a software product previously stored on the first MCP.

7. An apparatus for wireless communication device, comprising:
   a processor;
   memory in electronic communication with the processor; and
   instructions stored in the memory, the instructions being executable by the processor to:
   download, from a server, a software update to a first mobile computing platform (MCP);

receive, in response to the downloading, a download complete message from the first MCP;

identify a second MCP in proximity to the first MCP; and transmit a broadcast message from the server to the second MCP, wherein the broadcast message includes over-the-air (OTA) file download information regarding contacting the first MCP for downloading the software update;

wherein the OTA file download information comprises contact information that allows the second MCP to establish communication with the first MCP and identify the software update for download, and wherein the contact information contains an IP address of the first MCP to facilitate communication.

8. The apparatus of claim 7, wherein the instructions are further executable by the processor to:

assign the first MCP as a designated mobile device for downloading the software update to other MCPs; and transmit an assignment message to the second MCP, wherein the assignment message comprises a list of designated mobile devices.

9. A non-transitory computer-readable medium having instructions thereon for wireless communication, the instructions comprising:

code for downloading, from a server, a software update to a first mobile computing platform (MCP);

code for receiving, in response to the downloading, a download complete message from the first MCP;

code for identifying a second MCP in proximity to the first MCP; and code for transmitting a broadcast message from the server to the second MCP, wherein the broadcast message includes over-the-air (OTA) file download information regarding contacting the first MCP for downloading the software update;

wherein the OTA file download information comprises contact information that allows the second MCP to establish communication with the first MCP and identify the software update for download, and wherein the contact information contains an IP address of the first MCP to facilitate communication.

10. A method for wireless communication, comprising:

receiving, at a second mobile computing platform (MCP), a broadcast message from a server, wherein the broadcast message includes over-the-air (OTA) file download information regarding contacting the first MCP for downloading a software update, wherein the OTA file download information comprises contact information that allows the second MCP to establish communication with the first MCP and identify the software update for download, and wherein the contact information contains an IP address of the first MCP to facilitate communication;

establishing communication with a first MCP based on the broadcast message; and downloading the software update at the second MCP from the first MCP.

11. The method of claim 10, wherein downloading the software update at the second MCP comprises downloading at least one configuration parameter associated with the software update or an updated version of a software product previously stored on the second MCP.

12. The method of claim 10, wherein downloading the software update at the second MCP comprises downloading an updated version of a software product previously stored on the second MCP.

13. An apparatus for wireless communication device, comprising:

a processor;

memory in electronic communication with the processor; and instructions stored in the memory, the instructions being executable by the processor to:

receive, at a second mobile computing platform (MCP), a broadcast message from a server, wherein the broadcast message includes over-the-air (OTA) file download information regarding contacting the first MCP for downloading a software update, wherein the OTA file download information comprises contact information that allows the second MCP to establish communication with the first MCP and identify the software update for download, and wherein the contact information contains an IP address of the first MCP to facilitate communication;

establish communication with a first MCP based on the broadcast message; and download the software update at the second MCP from the first MCP.

14. A non-transitory computer-readable medium having instructions thereon for wireless communication, the instructions comprising:

code for receiving, at a second mobile computing platform (MCP), a broadcast message from a server, wherein the broadcast message includes over-the-air (OTA) file download information regarding contacting the first MCP for downloading a software update, wherein the OTA file download information comprises contact information that allows the second MCP to establish communication with the first MCP and identify the software update for download, and wherein the contact information contains an IP address of the first MCP to facilitate communication;

code for establishing communication with a first MCP based on the broadcast message; and code for downloading the software update at the second MCP from the first MCP.

\* \* \* \* \*